United States Patent [19]

Biebuyck

[11] Patent Number: 5,480,467
[45] Date of Patent: Jan. 2, 1996

[54] DEVICE FOR HEAT TREATING GLASSWARE AND CRYSTALWARE ARTICLES IN A PLANE PERPENDICULAR TO AN AXIS OF ROTATION

[75] Inventor: Leon Biebuyck, Obourg, Belgium

[73] Assignee: Etablissements Biebuyck S.A., Houdeng-Goegnies, Belgium

[21] Appl. No.: 117,033

[22] PCT Filed: Mar. 2, 1992

[86] PCT No.: PCT/BE92/00007

§ 371 Date: Sep. 2, 1993

§ 102(e) Date: Sep. 2, 1993

[87] PCT Pub. No.: WO92/15534

PCT Pub. Date: Sep. 17, 1992

[30] Foreign Application Priority Data

Mar. 5, 1991 [BE] Belgium ................................. 9100206

[51] Int. Cl.$^6$ ............................. C03B 29/00; G01D 9/60
[52] U.S. Cl. ................... 65/158; 65/160; 65/162; 65/271; 65/272
[58] Field of Search ............................. 65/160, 162, 158, 65/271, 272, 284, 269

[56] References Cited

U.S. PATENT DOCUMENTS 2,573,266 10/1951 Melcher et al. ..................... 65/269
2,704,418 3/1955 Gerbaud .
2,883,797 4/1959 Eldred .
3,193,369 7/1965 Benard et al. ........................ 65/272
3,790,087 2/1974 Banyas .

FOREIGN PATENT DOCUMENTS 1136999 5/1957 France .
2164526 8/1973 France .

*Primary Examiner*—David L. Lacey
*Assistant Examiner*—Steven P. Griffin
*Attorney, Agent, or Firm*—Flehr, Hohbach, Test, Albritton & Herbert

[57] ABSTRACT

A device for treating glassware and crystalware articles driven in rotation about an axis of rotation, which includes a mandrel upon which the articles is rotatably mounted. The device includes one of a heating source and a cooling source movable along a direction parallel to the treatment plane, and a data recording system having a control unit for storing and handling the data measured by a sensor relating to the angular position of each glassware or crystalware article. An intersection sensor is included to measure the distance between the external wall of each article and the heating mechanism. Further, a command unit controls the displacement and the location of the one movable heating and cooling source during treatment of the rotating article so as that a substantially constant spacing between the heating mechanism and the rotating articles is maintained.

7 Claims, 5 Drawing Sheets

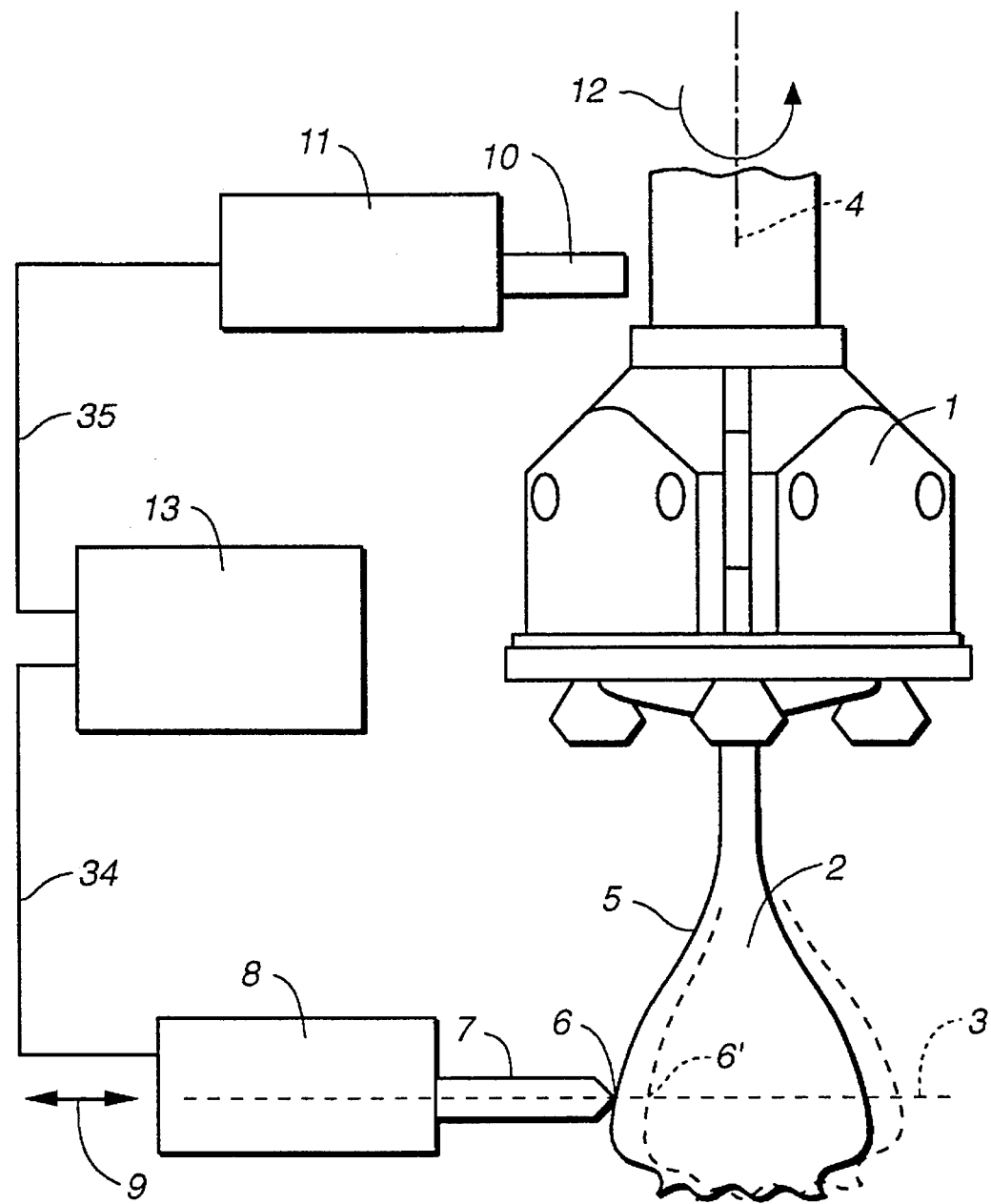
FIG._1

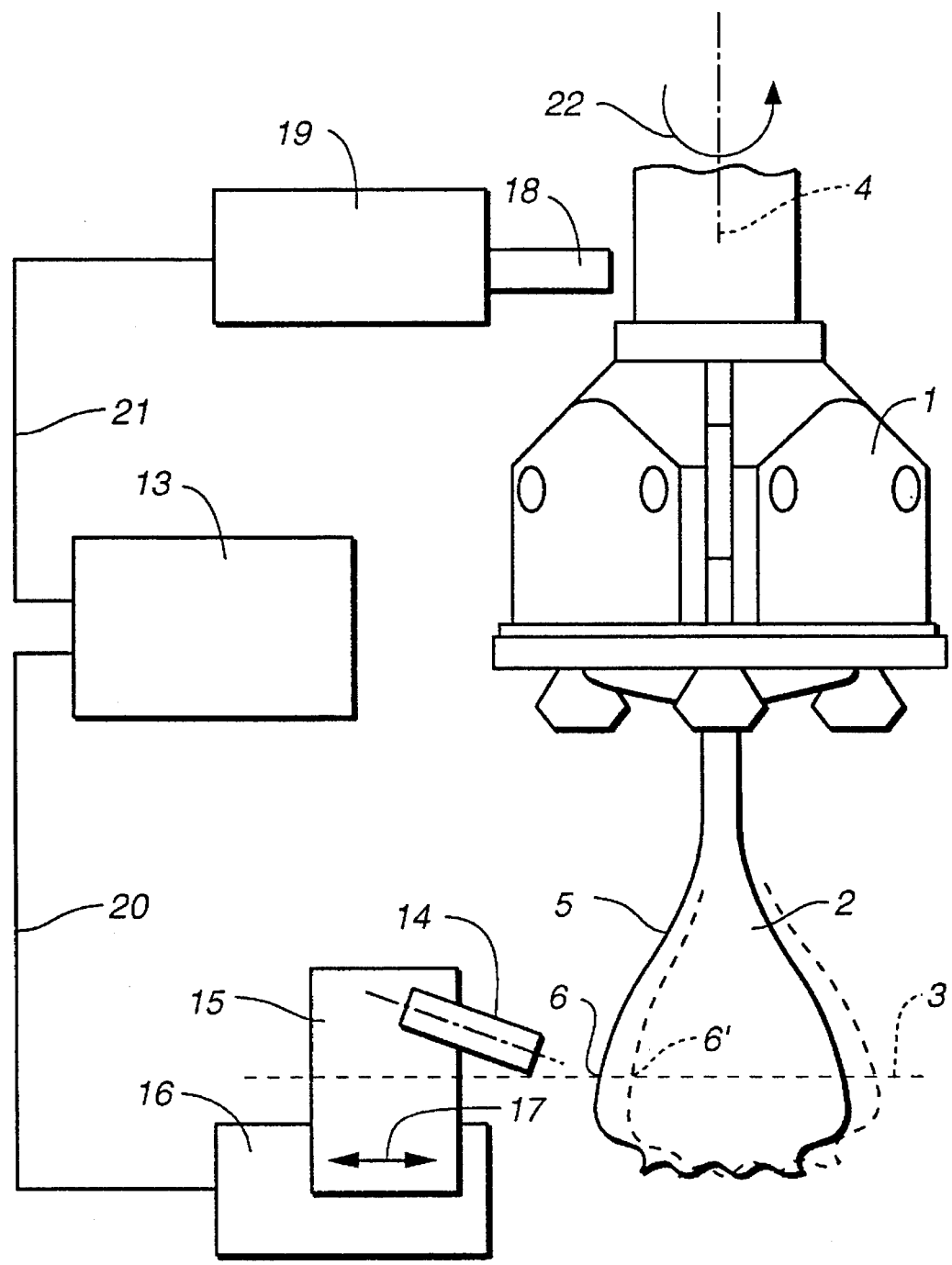
FIG._2

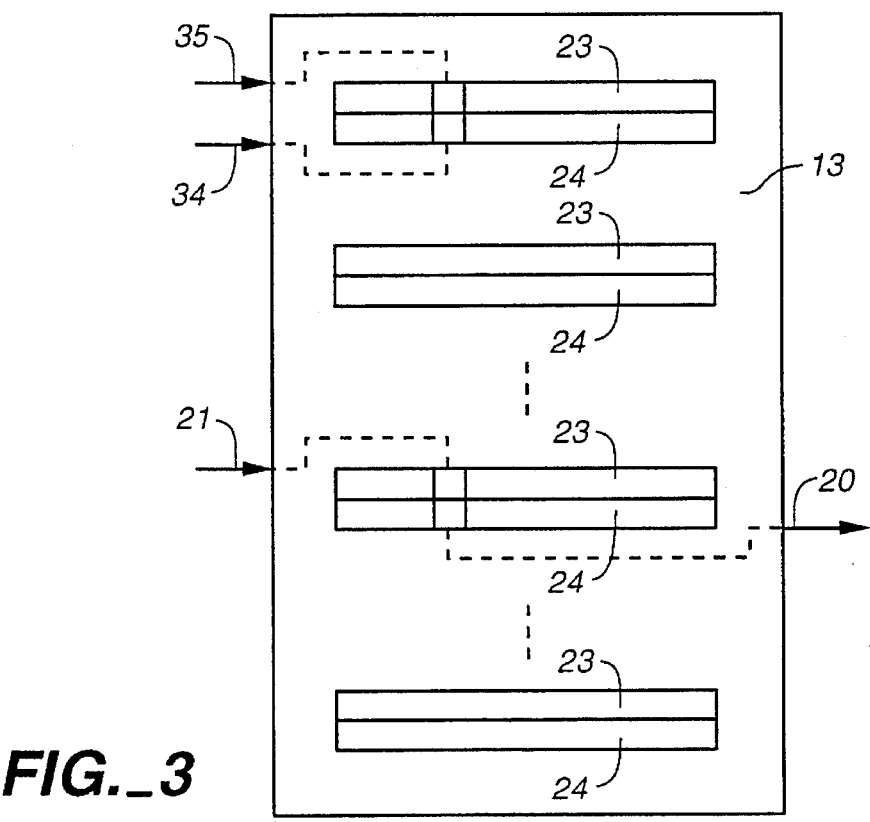
FIG._3
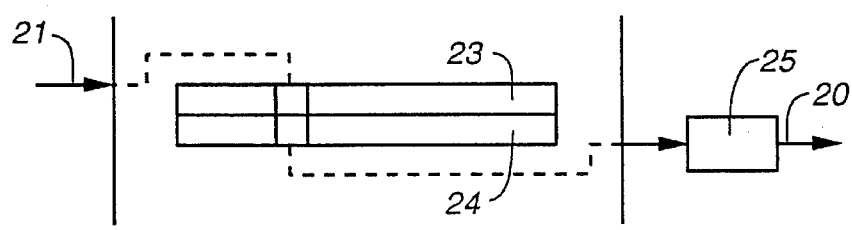
FIG._4
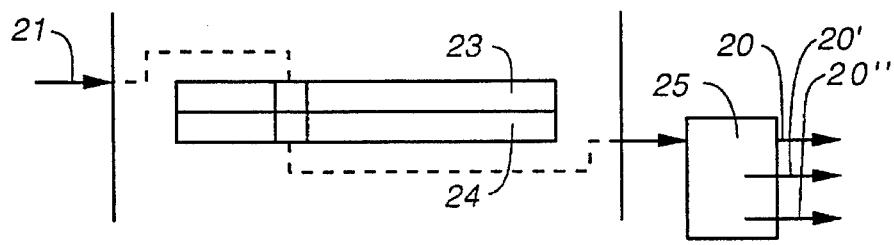
FIG._5

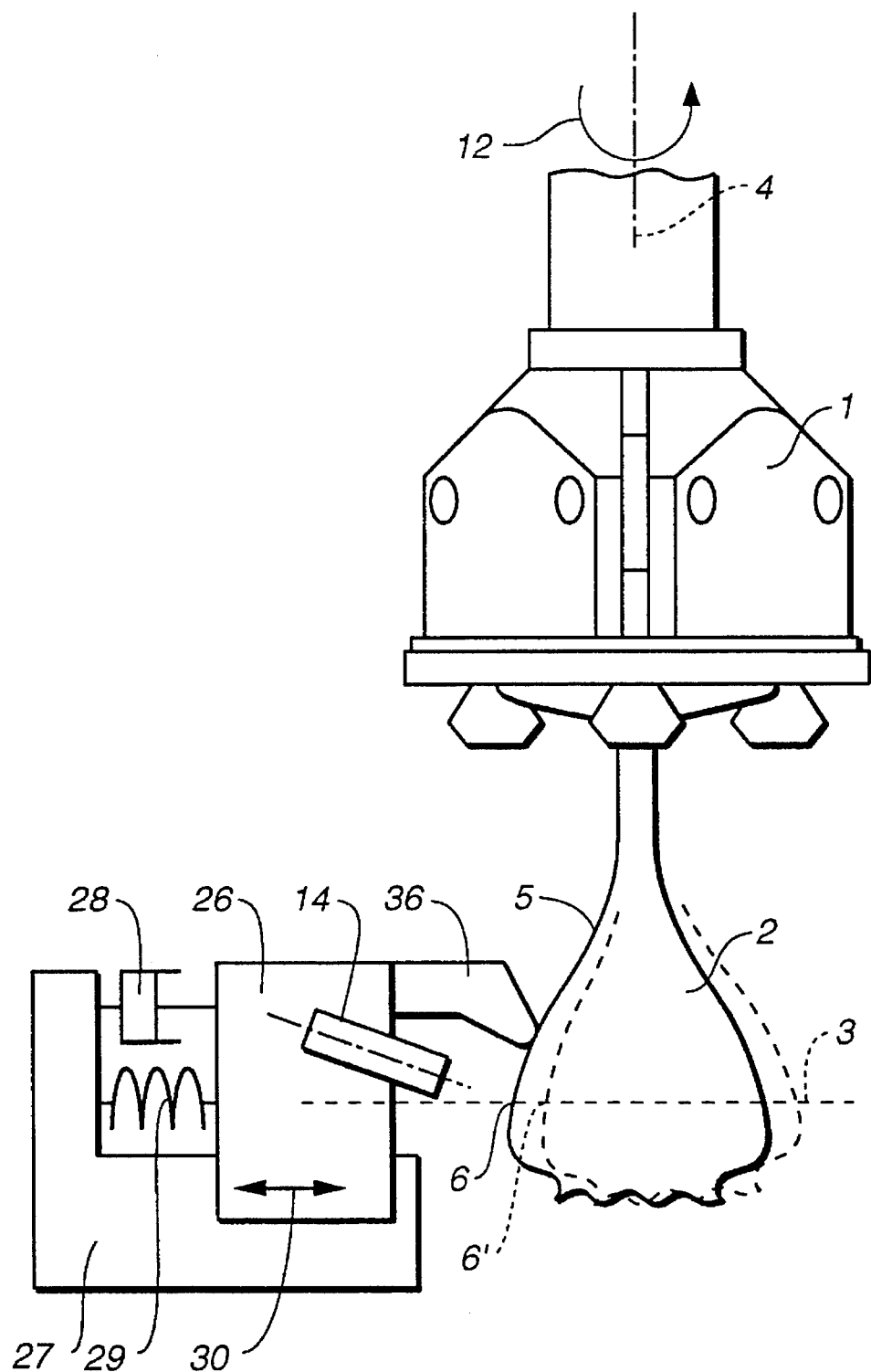
FIG._6

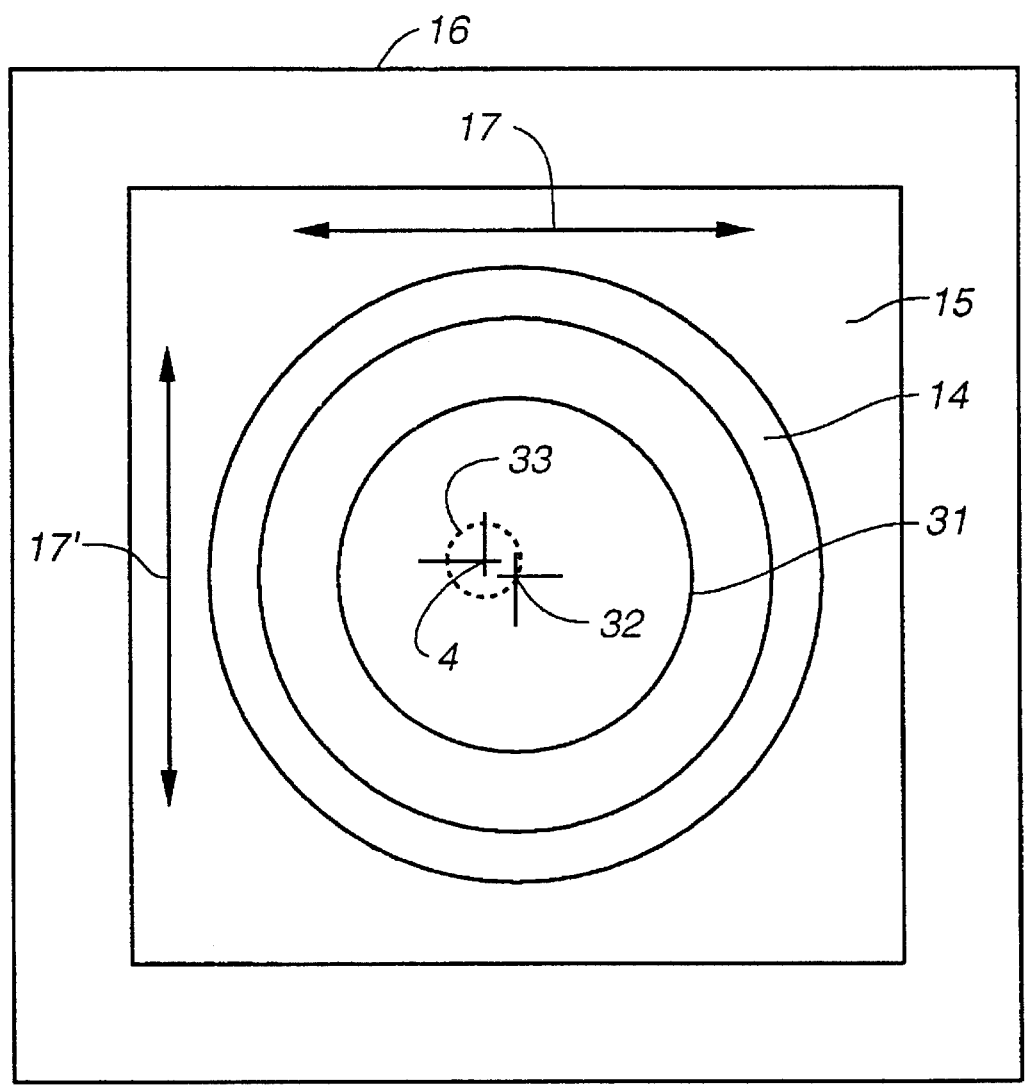
FIG._7

DEVICE FOR HEAT TREATING GLASSWARE AND CRYSTALWARE ARTICLES IN A PLANE PERPENDICULAR TO AN AXIS OF ROTATION

BACKGROUND OF THE INVENTION

1. Field of the Invention

The invention relates to the heat treating of glassware and crystalware articles in a plane perpendicular to an axis of rotation and to a device implementing such a method.

2. Description of the Prior Art

The purpose of the heat treatment of glassware or crystalware articles in a plane perpendicular to an axis of rotation is generally to introduce transient mechanical stresses into the material making up the article, which is generally fragile, or to bring a part or the whole of the material making up the article, which material is situated in proximity to this plane, to within the plastic range.

An operation involving the action of transient stresses is called demoiling. In this case, the stresses are intended to cause or to propagate fissures, designated as thermal fissures, the purpose of which is to separate from the article per se the mass of glass or crystal, hereinafter referred to as moil, which served to retain the article in the course of its phase of shaping by hot plastic deformation. The demoiling per se is generally preceded by a scribing operation, the purpose of which is to create at the surface of the fragile material making up the article, in the desired plane for the separation of the moil, hereinafter referred to as the demoiling plane, by the action of a blunt tool, a mechanical fissure which is generally resulting from earlier operations and to round off the edge of the article in such a manner as to make its use more pleasant.

The heat treatment of glassware or crystalware articles in a plane perpendicular to an axis of rotation is conventionally performed with the aid of a source of heat or of cold, for example one or more burners conventionally utilized, one or more laser beams, one or more infrared radiant sources, or any other type of appropriate heat or cold generators, judiciously disposed within the environment of the article, in such a manner as to induce within this article an adequate temperature field. The articles are conventionally caused to execute a rotational movement about the axis of rotation under consideration in such a manner that the temperature field is as similar as possible within each section of the article passing through this axis. The treatment is performed either at a single working station or at a plurality of working stations by periodic indexing, or in a continuous and progressive manner by a heat or cold source disposed in a rectilinear or curvilinear float; in this latter case, the articles to be treated pass along in front of this float at an appropriate speed and the position of the heat or cold source constituted by the float in relation to the article is defined in a conventional manner by the projection of the configuration in a plane perpendicular to the relative movement of the article in relation to the float.

The relative position of the heat or cold source in relation to the articles is conventionally regulable for each type of article, and in particular the relative position of the heat or cold source in relation to the articles in a plane passing through the axis of rotation of the article in the course of treatment. The inclination of the heat or cold source in relation to the axis or rotation of the article, especially if the source is highly directional, is also of importance and is conventionally regulable for each type of article.

The practice of the heat treatment of glassware or crystalware articles in a plane perpendicular to an axis of rotation shows that, in the majority of cases, the best result is obtained when the distance between the heat or cold source and the wall of the article to be treated is kept constant. The practice of the heat treatment utilizing the flame burner or any other highly directional heat source likewise shows that, in the majority of cases, the best result is obtained when the direction of the flame or more generally of the heat flux, in a plane including the axis of rotation of the article, is perpendicular to the wall of the article.

In current practice, the heat or cold source being positioned in relation to the article to be treated, either manually or by a more sophisticated automatic system, only for one type of article, without taking account of the disparities from article to article or of particular geometries linked to the type of article, it follows that the optimal conditions are realized during the entire treatment of a particular article only where the latter is round and if its axis of symmetry rigorously coincides with its axis of rotation.

Now, it is known from practical considerations that, although the articles of one and the same type are clearly similar, they are not rigorously identical. The dimensional difference is defined as the geometric defect between a real article and its ideal model. The articles constructed by means of automatic part-forming machines generally exhibit geometric defects of a few tenths of a millimeter, while the articles manufactured by craftsmen may exhibit geometric defects which are far larger, in the order of few millimeters; cases are also known in which it becomes necessary to treat articles, the cross section of which is intentionally not round, but is presented in the form of a regular polygon or of any other regular or irregular shape.

The variation of the distance between the heat or cold source and the wall of the article to be treated, from one article to another or, for one and the same article, during the rotation of the latter in front of the heat or cold source gives rise to variations of the temperature field in various sections of the article passing through its axis of rotation, Furthermore, in the practice of the heat treatment utilizing as heat source the flame burner or any other highly directional source, in the case where the heat source is inclined in relation to the axis of rotation of the article, a variation of the distance between the wall of the article and the heat source gives rise to a proportional displacement of the point of intersection of the wall and of the heat flux in relation to the selected treatment plane; this fact is highly detrimental and, in the case of demoiling, gives rise to irregular fractures which condemn the article or necessitate, in order to recover the same, lengthy subsequent machining operations.

From French Patent No. 2,164,526, a transfer machine is known, the burners of which are arranged in one or more curvilinear floats which take the exact shape of the displacement path of the articles to be treated, wherein said burners are disposed in the treatment plane and are directed perpendicularly to the external wall of the articles and the curvilinear float(s) are positioned by an ordinary mechanical device and remain fixed while the machine is working without manual intervention of any operator.

From U.S. Pat. No. 2,704,418 it is known also a machine with a single working station comprising several burners arranged in a circle in regard to the axis of the mandrel bearing the article. Said burners are inclined in relation to the treatment plane and their direction makes a small angle with the external wall of the article, in this document too, the position of the burners is manually regulated and remains unchanged throughout the entire duration of the treatment.

French Patent No. 1,136,999 discloses a transfer machine for cutting off glass tubes. This machine comprises at least one marking-off station and a heating station. On the marking-off station, the edge-tool is elastically maintained against the external wall of the tube. The heating station comprises a sole burner arranged in the plane of treatment and is disposed tangentially in relation to the wall. In this document, the burner is mounted on a carrier connected to by means of a mechanism to a path which is elastically maintained in contact with the external wall of the tube, wherein the displacement of the contact path in function of the concentricity disparities or ovalization disparities controlling the displacement of the burner, in such manner that the flame remains tangential in regard to the tube.

Hence, the following up of a heat source is a function of disparities from a particular article. In this case, only the tangential direction of the burner is maintained unchanged while the distance in relation to the action point on the external wall may fluctuate in large limits.

The purpose of the present invention is to remedy to the drawbacks described alone.

SUMMARY OF THE INVENTION

According to the invention, the device for heat treating glassware and crystalware articles in a plane perpendicular to an axis of rotation, including the mandrel maintaining the article to be treated in rotation about the axis perpendicular to the treatment plane, comprising a heat or cold source mounted on a support which can be displaced in relation to the seating along the direction defined as parallel to the treatment plane, characterized in that it comprises a first sensor (7) which in the course of a previous data acquisition operation measures the position of the intersection (6) of the external wall (5) of the article (2) in rotation and of the treatment plane (3) as a function of the angular position of the article (2) as measured by a second sensor (10), and a storage and command unit (13) which stores and processes the data transmitted by the sensors (7) and (10), and in that it utilizes these data in the course of the treatment per se to drive the displacement along the direction (17) defined as parallel to the treatment plane, of the heat or cold source (14), in such a manner that the position of this heat or cold source (14) is substantially constant in relation to said intersection (6), irrespective of the angular position of the article (2) in continuous rotation about the axis (4), this being so throughout the entire duration of the treatment.

The advantage obtained by virtue of this invention consists essentially in that the temperature field created by the heat or cold source is substantially constant within all the sections of the article passing through its axis of rotation in relation to the selected treatment plane and thus that the effect of this treatment is, itself as well, substantially constant within all the sections of the article passing through its axis of rotation in relation to the selected treatment plane.

The invention is set forth hereinbelow in greater detail, with reference to drawings representing solely and in a nonlimiting manner, various embodiments.

BRIEF DESCRIPTION OF THE DRAWINGS

FIG. 1 represents, in elevation, a part of the device implementing the heat treatment of glassware and crystalware articles in a plane perpendicular to an axis of rotation according to the present invention, that is to say the device for acquisition of the geometric data.

FIG. 2 represents, in elevation, a part of the device implementing the heat treatment of glassware and crystalware articles in a plane perpendicular to an axis of rotation according to the present invention, that is to say the treatment device per se.

FIG. 3 diagrammatically represents a possible construction of the storage and command unit shown in FIGS. 1 and 2.

FIG. 4 diagrammatically represents a part of a possible construction of the storage and command unit shown in FIGS. 1, 2 and 3.

FIG. 5 diagrammatically represents a part of a possible construction of the storage and command unit shown in FIGS. 1, 2 and 3.

FIG. 6 shows, in elevation, a particularly simple construction of the device implementing the heat treatment of glassware and crystalware articles in a plane perpendicular to an axis of rotation according to the present invention.

FIG. 7 shows, in plan, a possible construction of the device implementing the heat treatment of glassware and crystalware articles in a plane perpendicular to an axis of rotation according to the present invention, in the case where the article is of substantially circular or similar shape and the heat or cold source is of annular shape.

DETAILED DESCRIPTION OF THE PREFERRED EMBODIMENT

The figures show a device implementing the heat treatment of glassware and crystalware articles in a plane perpendicular to an axis of rotation according to the present invention, essentially comprising a mandrel 1 retaining an article 2 to be heat-treated in a plane 3 substantially perpendicular to the axis of rotation 4 of the mandrel 1; the intersection 6 of the external wall 5 of the article 2 with the plane 3 in a given direction 9 varies generally with the angular position of the article 2; the point 6' indicates another position of the point 6 at another instant of the rotation of the article.

In the course of the phase of acquisition of the geometric data, a sensor 7 forming part of a sequential measurement system 8 records at known instants the position of the point 6 in the direction 9 perpendicular to the axis of rotation 4 while, at the same known instants, another sensor 10 forming part of another sequential measurement system 11 records the angular position 12 of the mandrel 1 and thus likewise of the article 2; these recordings are transmitted via the lines 34 and 35 to a storage and command unit 13.

The treatment per se is carried out by a heat or cold source 14 mounted on a support 15 which is itself movable along a direction 17 parallel to the direction 9 in relation to a seating 16 constituting a drive unit; the information items necessary for the drive of the displacement of the support 15 in relation to the seating 16 along the direction 17 are transmitted at known instants by the storage and command unit 13 via the line 20 as a function of the angular position 22 of the mandrel 1 and thus likewise of the article 2, measured at the same known instants by the sensor 18 forming part of a sequential measurement system 19 and transmitted by the line 21 to the storage and command unit 13.

As is diagrammatically shown in FIG. 3, in the course of the data acquisition phase the information items originating from the sensor 10 via the line 35 concerning the angular position 12 of the mandrel 1 are stored on a data medium 23 and the information items originating from the sensor 7 via the line 34 concerning the geometric position of the point 6 in the direction 9, in this case parallel to the direction 17, are stored on a data medium 24; the data media 23 and 24 are such that a biunique relation is established between the data taken at identical instants.

In the course of the treatment per se, the information originating from the sensor 18 via the line 21 concerning the angular position 22 of the mandrel 1 is compared with the information items previously recorded on the data medium 23 and the information corresponding to the current value of the angular position 22 of the article 2, previously recorded on the data medium 24 and concerning the geometric position of the point 6 in the direction 17, is passed via the line 20 to the seating 16 constituting a drive unit.

In the case where a plurality of articles are to be treated at the same time at different working stations, which is the case for a transfer machine comprising a plurality of successive treatment stations, a plurality of pairs of data media 23 and 24 are necessary in order to hold in memory simultaneously the characteristics of the plurality of articles 2; the storage of the information items concerning each new article 2 to be treated is then carried out on the successive pairs of data media 23 and 24, in accordance with the principle of the data processing stack "first in, first out".

FIG. 4 diagrammatically shows that, in the case where the direction or the magnitude of the displacement of the support 15 of the heat or cold source 14 along the direction 17 is not directly equal to the magnitude of the displacement of the point 6 as recorded by the sensor 7 in the direction 9, a computation unit 25 is provided between the data medium 24 and the seating 16 constituting the drive unit.

FIG. 5 diagrammatically shows that, in the case where the displacement of the support 15 of the heat or cold source 14 takes place along a plurality of combined directions 17, 17', 17", . . . , the computation unit 25 is provided with a plurality of outputs 20, 20', 20". . . , each one of which supplies the information necessary for the various axes of positioning of the heat or cold source 14.

FIG. 6 shows a particularly simple construction of the device implementing the heat treatment of glassware and crystalware articles in a plane perpendicular to an axis of rotation, in which device the sensor 7 is replaced by a bearing element 36 mounted on the same mechanical support 26 as the heat or cold source 14; the mechanical support 26 possesses a degree of freedom along the direction 30 perpendicular to the axis of rotation 4 in relation to a fixed support 27 and is resiliently applied to the external wall 5 of the article 2 in the vicinity of the point 6, the intersection of the external wall 5 of the article 2 and the treatment plane 3, by the action of a system comprising a spring 28 and tamper 29; by this system, the heat or cold source 14 remains substantially fixed in relation to the point 6 while the inclination of the wall 5 of the article 2 in relation to the axis of rotation 4 is substantially constant in the vicinity of the point 6 in the course of the rotation of the article 2.

FIG. 7, in which the article 2 is represented, in plan, by the trace 31 of the intersection with the treatment plane 3 of its external wall 5, shows that, in the case where the article 2 is of substantially circular or similar shape and the heat or cold source 14 is of annular shape, it is envisaged to maintain the article 2 and the heat or cold source 14 concentric throughout the entire duration of the treatment; in the case where the geometric center 32 of the intersection 31, likewise substantially circular or similar, is not coincident with the axis of rotation 4, a possible construction of the device implementing the heat treatment of glassware and crystal articles in a plane perpendicular to an axis of rotation consists in that the support 15 of the heat or cold source 14 is displaced in relation to the seating 16 along two directions 17 and 17' in such a manner that at any instant the intersection 31 is maintained concentric with the heat or cold source 14; in this case, the information items supplied by the sensor 7 and stored in the storage and command unit 13 are processed by a computation unit 25 as indicated in FIG. 5 in such a manner that the combination of the displacements along the directions 17 and 17' describes the circle 33, the place of displacement of the center 32 of the trace 31 in the course of the rotation of the article 2 about the axis of rotation 4.

I claim:

1. A heat treatment device for treating glassware and crystalware articles in a treatment plane perpendicular to an axis of rotation, including a mandrel maintaining an article to be treated in rotation about the axis perpendicular to the treatment plane, said device comprising:

a heating source for treatment of said article, and mounted on a support for displacement in a direction parallel to said treatment plane;

a first sensor and a second sensor, said first sensor, in the course of a previous data acquisition operation, situated to measure the position of the intersection of an external wall of the rotating article and of said treatment plane as a function of the angular position of said article as measured by said second sensor; and a data storage and command unit for recording and processing data transmitted by said first and said second sensor, said data enabling said storage and command unit to control the location and said displacement of the heating source, during said treatment, to maintain the spacing between the displaceable heating source, and said intersection substantially constant regardless of said angular position of said article in continuous rotation about said axis.

2. The device according to claim 1 wherein, said data storage and command unit is located at a first workstation, and said heating source is located at a separate second workstation.

3. The device according to claim 1 wherein, said data storage and command unit records and processes said data at a first time segment, and said heating source treats said article at a second time segment.

4. The device according to claim 1 wherein, said data storage and command unit records and processes said data substantially simultaneously with the heat treatment of said article.

5. The device according to claim 4 wherein, an angular position of said first sensor is different from an angular position of said heating source relative the rotational axis of said mandrel.

6. The device according to claim 4 wherein, an angular position of said first sensor is substantially the same as an angular position of said heating source relative the rotational axis of said mandrel.

7. The device according to claim 1 wherein, said heating source is mounted on said support for displacement in at least two non-parallel directions relative one another in said treatment plane.

* * * * *